(12) United States Patent
Lu et al.

(10) Patent No.: US 8,527,070 B2
(45) Date of Patent: Sep. 3, 2013

(54) SYSTEM AND METHOD FOR LARGE TRANSIENT IDENTIFICATION FOR ADVANCED CONTROL WITH MULTIPLE CONTRAINTS

(75) Inventors: Manxue Lu, Cincinnati, OH (US); Thomas Charles Swager, Maineville, OH (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 13/075,255

(22) Filed: Mar. 30, 2011

(65) Prior Publication Data
US 2012/0253478 A1 Oct. 4, 2012

(51) Int. Cl.
*G05B 19/05* (2006.01)
(52) U.S. Cl.
USPC .......................................................... 700/12
(58) Field of Classification Search
USPC ............................................................ 700/12
See application file for complete search history.

(56) References Cited

U.S. PATENT DOCUMENTS

| | | | | |
|---|---|---|---|---|
| 4,836,096 A | * | 6/1989 | Avery | 454/238 |
| 5,726,892 A | * | 3/1998 | Tang et al. | 701/110 |
| 6,928,125 B2 | * | 8/2005 | Nakano et al. | 375/341 |
| 7,630,779 B2 | * | 12/2009 | Kelly | 700/37 |
| 2004/0123600 A1 | * | 7/2004 | Brunell et al. | 60/773 |
| 2005/0033500 A1 | * | 2/2005 | Moss | 701/100 |

* cited by examiner

*Primary Examiner* — Kavita Padmanabhan
*Assistant Examiner* — Patrick Cummins
(74) *Attorney, Agent, or Firm* — Global Patent Operation

(57) ABSTRACT

A method and apparatus for providing large transient identification for advanced control with multiple constraints. A request to change a current operating condition of a controlled plant is detected. A value of a control constraint corresponding to the request to change the current operating condition of the controlled plant is determined. A magnitude of a transient error corresponding to the request relative to the value of the control constraint is determined and the current operating condition of the controlled plant is adjusted based on the determined magnitude of the transient error.

18 Claims, 10 Drawing Sheets

SYSTEM AND METHOD FOR LARGE TRANSIENT IDENTIFICATION FOR ADVANCED CONTROL WITH MULTIPLE CONTRAINTS

BACKGROUND OF THE INVENTION

1. Field of the Invention

The present disclosure generally relates to control systems, and more particularly to large transient identification for advanced control.

2. Description of Related Art

A Multiple Input Multiple Output (MIMO) regulator generally provides optimum stability and dynamic response with multiple, interacting control variables. The dynamics in the MIMO regulator are generally designed for steady state, quasi-steady state and small transient type responses. For very large transients however, the MIMO regulator, due to a combination of very large demand errors and engine-model mismatches, may provide responses that are not optimum for protecting plant limitations, such as for example, engine limits. It would be advantageous to be able to improve large transient control using a MIMO regulator.

Accordingly, it would be desirable to provide a system and apparatus that addresses at least some of the problems identified above.

BRIEF DESCRIPTION OF THE INVENTION

As described herein, the exemplary embodiments overcome one or more of the above or other disadvantages known in the art. One aspect of the exemplary embodiments relates to a method. In one embodiment, the method includes detecting, in a controller, a primary reference input corresponding to a request to change a current operating condition of a controlled plant, determining a value of a control constraint corresponding to the request to change the current operating condition of the controlled plant, determining a magnitude of a transient error corresponding to the request relative to the value of the control constraint, and adjusting the current operating condition of the controlled plant based on the determined magnitude of the transient error.

In another aspect the exemplary embodiments relate to a control system for a controlled plant. In one embodiment the control system includes a control input detector configured to detect a request to change a current operating condition of the controlled plant, a constraint error normalization device configured to determine, for a control constraint of the controlled plant associated with the request, a normalized error of the control constraint to a maximum limit and a normalized error of the control constraint to a minimum limit. The control system also includes a controller coupled with the control input detector and constraint error normalization device that is configured to determine a magnitude of a transient error relative to the request to change an operating condition of the controlled plant by comparing a value of a primary reference input corresponding to the request to the normalized error of the control constraint to the maximum limit and the normalized error of the control constraint to the minimum limit, and adjust the current operating condition of the controlled plant based on the determined magnitude of the transient error.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and unless otherwise indicated, they are merely intended to conceptually illustrate the structures and procedures described herein. In addition, any suitable size, shape or type of elements or materials could be used.

DETAILED DESCRIPTION OF THE EXEMPLARY EMBODIMENTS OF THE DISCLOSURE

Figure 1:
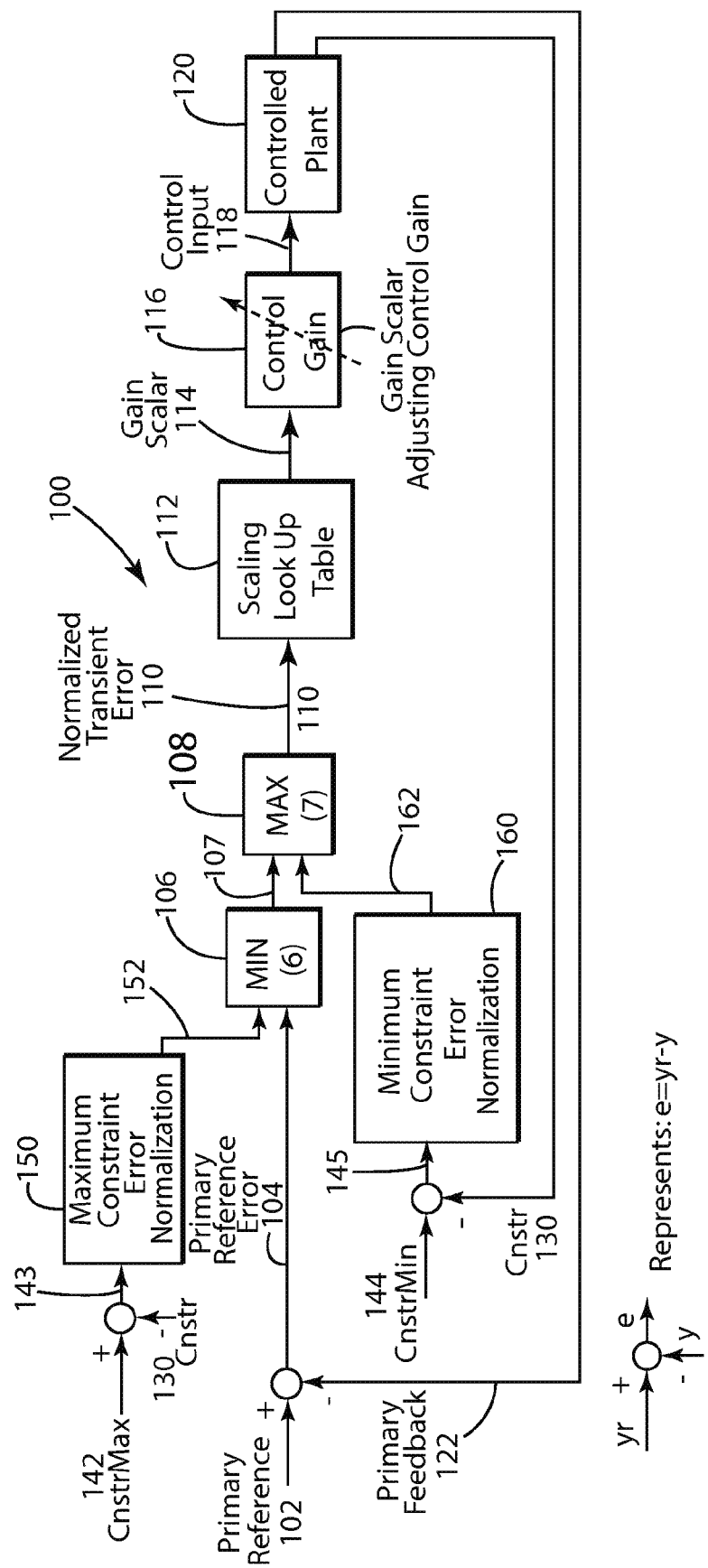
FIG. 1 illustrates a top level diagram for a system incorporating aspects of the present disclosure.

Referring to FIG. 1, one or more aspects of the disclosed embodiments are generally directed to evaluating transient control input behavior and control constraints associated with a primary reference input 102 of a controlled system or plant 120. The aspects of the disclosed embodiments generally include looking at the change, or error, between the current operating condition(s) and all potential control constraints that correspond to, or are associated with, the request or control input corresponding to the primary reference input 102. The term "primary reference input" or "transient control input" 102, as is used herein, generally refers to a command input or a control input that is indicative of a request to change a current operating condition of a controlled plant 120 or other measurement that is the primary controlled variable for a specific application or process, such as for example, a jet engine or an electrical generator.

Based upon certain aspects of the primary reference input 102 and associated control constraints, the actions or responses of the system 120 can be controlled to ensure steady and safe operation. Non-limiting examples of controlled systems or plants 120 include propulsion systems for aircraft and/or other types of vehicles and electrical power generation systems, such as turbine based generator systems, wind turbines and marine turbines.

For example, in an aircraft, when a pilot quickly increases the throttle, a primary reference input signal 102, in the form of a throttle increase, is generated and is detected. A primary reference error signal 104 is generated from the difference between the primary reference input signal 102 and a primary reference feedback signal 122. In order to ensure the continued and safe operation of the aircraft and the engine, a control must be implemented that ensures a response to the primary reference input signal 102 (or throttle control in this example) that is within the limits of the aircraft and engine. This can be particularly true when the primary reference input signal 102 is of a large nature, such as when the engine must accelerate quickly from a low thrust and low engine speed to a high thrust and high engine speed, as is needed during aircraft takeoff and/or during flight.

For example, in a gas turbine based powerplant, electricity is generated through a generator. Large transient signals, also referred to as transients, can result from load variations due to changes in electrical power demand or certain failure situations. When an operator quickly increases the throttle of a turbine-based generator, a primary reference input signal or transient 102 responsive to the throttle increase develops or is generated. The difference between the primary reference input signal 102 and the primary reference feedback signal 122 produces the primary reference error signal 104. When the primary reference input signal 102 is of a large nature, the aspects of the disclosed embodiments implement a control that ensures a response to the primary reference input 102 (or throttle control in this example) that is within the limits of the turbine-based generator. The aspects of the disclosed embodiments ensure the continued and safe operation of the turbine-based generator in situations where the primary reference signal 102 is a large transient, such as for example, when the turbine must accelerate quickly from a low thrust and low engine speed to a high thrust and high engine speed, as is needed during startup and/or during peak demand periods, Another example of the application of aspects of the disclosed embodiments includes a driver in a vehicle loop control, such as a car, ship or airplane. Large versus small power maneuvers will require different control gains and schedules to ensure that such power maneuvers are within the limits of the vehicle. In a wind or marine turbine application, the control must be able to respond to large transient inputs or errors that are generated from factors such as wind gusts and overspeed conditions. The aspects of the disclosed embodiments can be applied in these environments to ensure that responses to such wind gusts or overspeed conditions are within the limits of the wind or marine turbine.

FIG. 1 illustrates one embodiment of a system 100 for large transient identification for advanced control with multiple constraints. As is shown in FIG. 1, the primary reference input 102 generally corresponds to a command input or a control input, also referred to herein as a "request", that is indicative of a request to change a current operating condition of the controlled plant 120. For example, where the controlled plant 120 is a turbofan engine application, the primary reference input 102 can be associated with or responsive to an increase or decrease of the throttle control.

There are a number of actions or responses associated with the primary reference input 102, generally referred to herein as "constraints", that must be carefully monitored and controlled to avoid undesirable operating conditions or situations. The term "control constraint" or "constraint", as is used herein, generally refers to a primary controlled variable for a specific application or process. Although the examples described herein will generally reference a single control constraint, it will be understood that the aspects of the disclosed embodiments can be applied to, or used in conjunction with, multiple control constraints. For example, in an aircraft environment, a control constraint such as a fan speed demand, that is associated with a throttle input from the cockpit, must be carefully regulated to avoid an over or under speed condition. Other examples can include the acceleration of a gas turbine to high power during an aircraft takeoff, and decelerating the gas turbine for landing/stopping. Each of these situations also requires the careful control and regulation of certain engine constraints, which as will be generally understood, can include, but are not limited to, rotational speed, linear speed, temperature, pressure, torque, noise level or vibration. Control constraints can also be described as a measurement that is the primary controlled variable for a specific application or process. Generally, the primary reference input 102 will include any suitable command, control or demand input indicative of a request for a change of a current operating condition(s) for a controlled plant application that requires stability and dynamic response with multiple, interacting control variables and control constraints.

As shown in FIG. 1, the primary reference input 102 and primary reference feedback signal 122 are combined to produce a primary reference error signal 104. The primary reference error signal 104 is the difference between the demanded value or request, as indicated by the primary reference input 102, and the feedback value, indicated by the primary reference feedback signal 122.

As noted above, at least one control constraint is associated with the primary reference input 102. For purposes of the description herein, the control constraint will be represented by the input Cnstr 130, which in one embodiment is a constraint feedback parameter. Each control constraint will have a maximum constraint limit 142, which generally corresponds to the maximum limit of the constraint, and a minimum constraint limit 144, which generally corresponds to the minimum limit of the constraint. The term "limit", as used herein, is generally a reference value for the particular maximum constraint or minimum constraint. In one embodiment, the maximum and minimum constraint limits are predetermined values.

The aspects of the disclosed embodiments "normalize" each control constraint with respect to the primary reference input 102. In order to normalize each constraint against the primary reference input 102, the output 143, which is the difference between the maximum constraint limit 142, CstrMax in FIG. 1, less Cnstr 130 will be applied to a maximum constraint normalization process in module 150. The output 145, which is the difference between the minimum constraint limit 144, CnstrMin in FIG. 1, less Cnstr 130, will be applied to a minimum constraint normalization process in module 160. This provides the advantage that all control constraints will be considered in the determination of the proper gain scalar 114.

In one embodiment, the maximum constraint error normalization process in module 150 normalizes the output 143 to determine the normalized maximum constraint error 152. The maximum constraint limit 142 is based on hardware limits and/or operational limits specified for the controlled plant 120. The minimum constraint error normalization process in module 160 normalizes the output 145 to determine the normalized minimum constraint error 162. The maximum constraint error normalization process in module 150 and the minimum constraint error normalization process in module 160 are used to determine whether the primary reference error 104 determines the magnitude of the requested primary reference input 102, or whether one of the control constraints will limit the magnitude of the primary reference input 102. The maximum constraint error normalization process in module 150 and the minimum constraint error normalization process in module 160 are applied to each of the control constraint(s) that are associated with the primary reference input 102.

Once the normalized maximum constraint error 152 and the normalized minimum constraint error 162 have been generated, a minimum select function 106 selects the lowest value of or between the primary reference error signal 104 and normalized maximum constraint error 152, which can also be referred to as the normalized error of the constraint signal to its maximum limit. This is required to allow appropriate tuning of the primary reference error signal 104 if a maximum or minimum constraint will be encountered prior to the controlled plant 120 reaching the control input value corresponding to the primary reference control input 102. This provides the advantage that all constraints will be considered appropriately in the determination of the proper gain scalar 114. A maximum select function 108 then selects the maximum value of or between the output 107 of the minimum select function 106 and the normalized minimum constraint error 162.

The output 110 of the maximum select function 108 represents the "normalized transient error." The normalized transient error signal 110 generally indicates the size and/or magnitude of the primary reference input 102 relative to a current operational state of the controlled plant 120, which as described herein can be limited by one or more control constraints. The normalized transient error 110 is used in the digital control for control scheduling of engine variable geometries, fuel flows or control dynamic gains. In the case of a jet engine application, a normalized transient error 110 that is near zero generally indicates that the engine is close to demanded power or "on a constraint." The term "on a constraint" in this example generally means that the engine has stabilized on either the primary reference input 102, a constraint maximum limit 142 or a constraint minimum limit 144. In the case of a jet engine, if the normalized transient error 110 is a positive value, this positive value generally indicates that the primary reference input 102 is an acceleration transient. The larger, or more positive, the value or magnitude of the normalized transient error 110, the larger the requested acceleration transient. A normalized transient error 110 that has a negative value generally indicates that the primary reference control input 102 is a deceleration transient request. The more negative the value or magnitude of the normalized transient error 110, the larger the requested deceleration transient. In absolute terms, an absolute value of the magnitude of the normalized transient error 110 corresponds in general terms to a relative magnitude of the requested transient, or primary reference control input 102.

Figure 6:
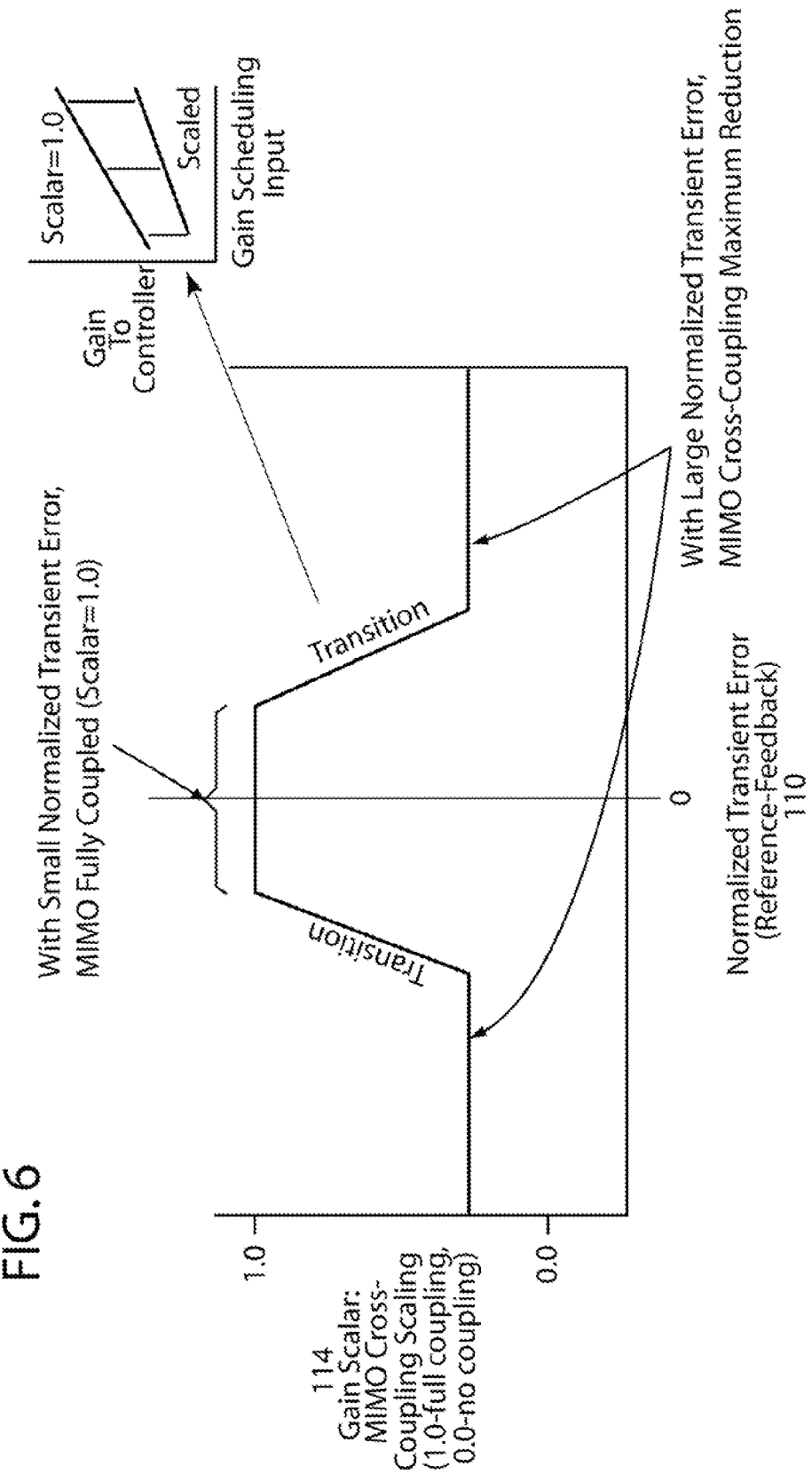
FIG. 6 illustrates one example of a scaling look-up table to be used in a system incorporating aspects of the present disclosure.
Figure 7:
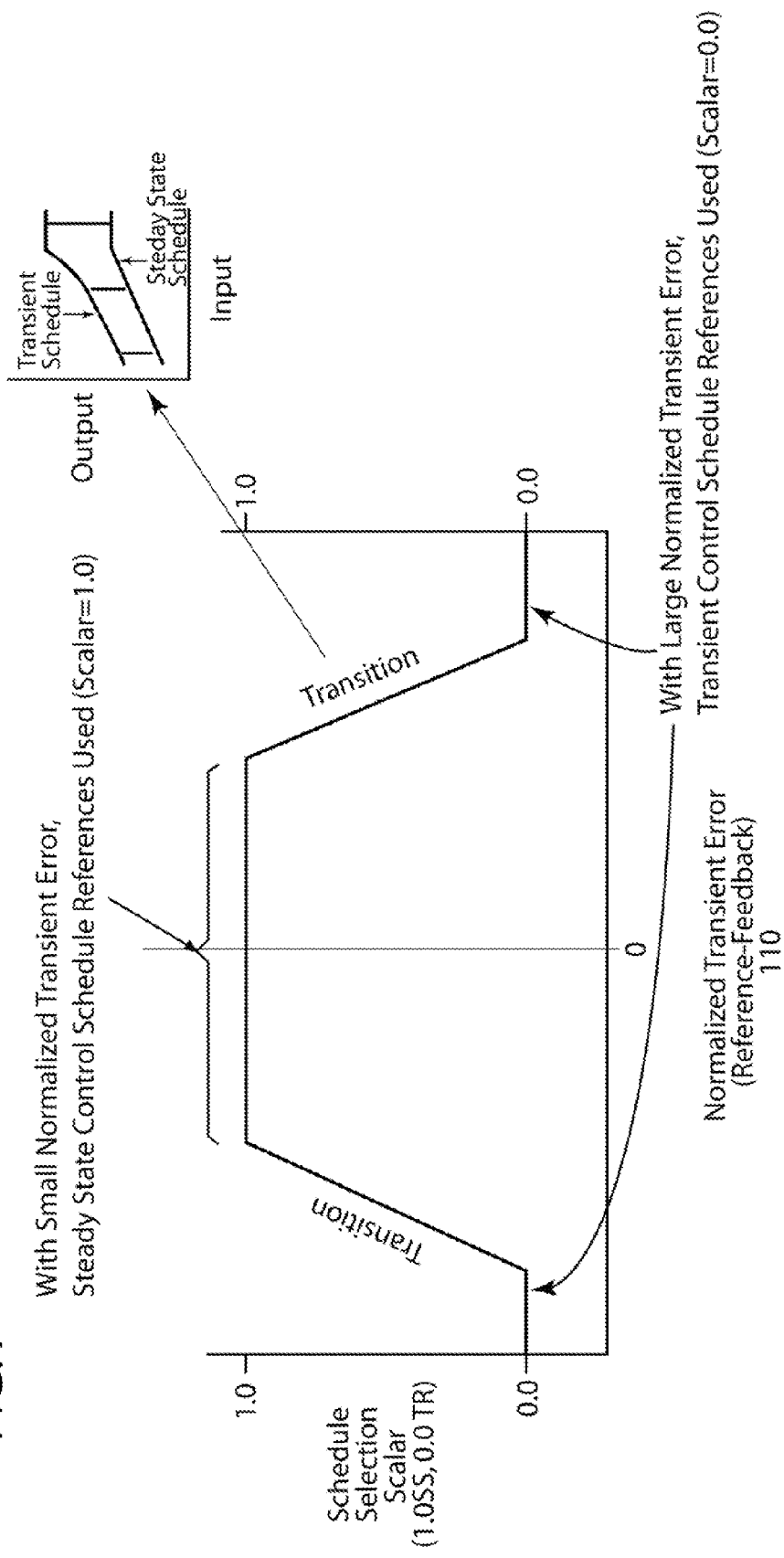
FIG. 7 illustrates one example of a scaling look-up table for selecting transient versus steady state control schedules in a system incorporating aspects of the present disclosure.

In order to suitably control the controlled plant 120 relative to the primary reference input 102, a scaling look-up table(s) 112 uses the normalized transient error 110 to modify certain control schedules or control dynamics of the controlled plant 120. The scaling look-up tables 112 are lookup tables that are stored in, or communicatively coupled with, the digital controller of the controlled plant. In the case of a jet engine, the scaling look-up table(s) 112 are generally used to control schedules that affect how engine variable geometries, such as fuel flows, are being set on the engine. These tables are generally predetermined or preconfigured and stored. Examples of these tables are shown in FIGS. 6 and 7, which show how the normalized transient error 110 can be used to modify the control for transient versus steady state operation.

Referring to FIG. 1, the output 114 of the table(s) 112 is typically a gain scalar ranging in value or magnitude from approximately 0.0 to 1.0. The gain scalar 114 is used to modify the control schedule or control dynamic values for use in the control system software. In the case of a jet engine, the gain scalar 114 can be used to accomplish the desired change in engine plant variable geometries, such as fuel flows or control dynamic gains. Box 116 in FIG. 1 represents the calculation of applying a schedule scalar value and/or gain scalar 114 in the digital engine control of the controlled plant 120 to obtain the desired variable geometry positions, fuel flows and regulator performance for the controlled plant 120. With a smaller primary reference input 102, a gain scalar 114 of 1.0 can be used. For a larger primary reference input 102, a gain scalar 114 value of less than 1.0 can be used. For example, if an exemplary control schedule A is defined by a gain scalar 114 output of 1.0, and is intended for steady state operation, and a control schedule B is defined by a gain scalar 114 output of 0.0, and is intended for transient operation, the scheduled value or control input 118 can be calculated in the digital engine control using the equation: {Output=((Schedule A−Schedule B)×Gain Scalar 114)+Schedule B}.

A more detailed explanation of the constraint error normalization process in module 150 and the minimum constrain error normalization process in module 160 follows with reference to FIGS. 2-5.

Figure 2:
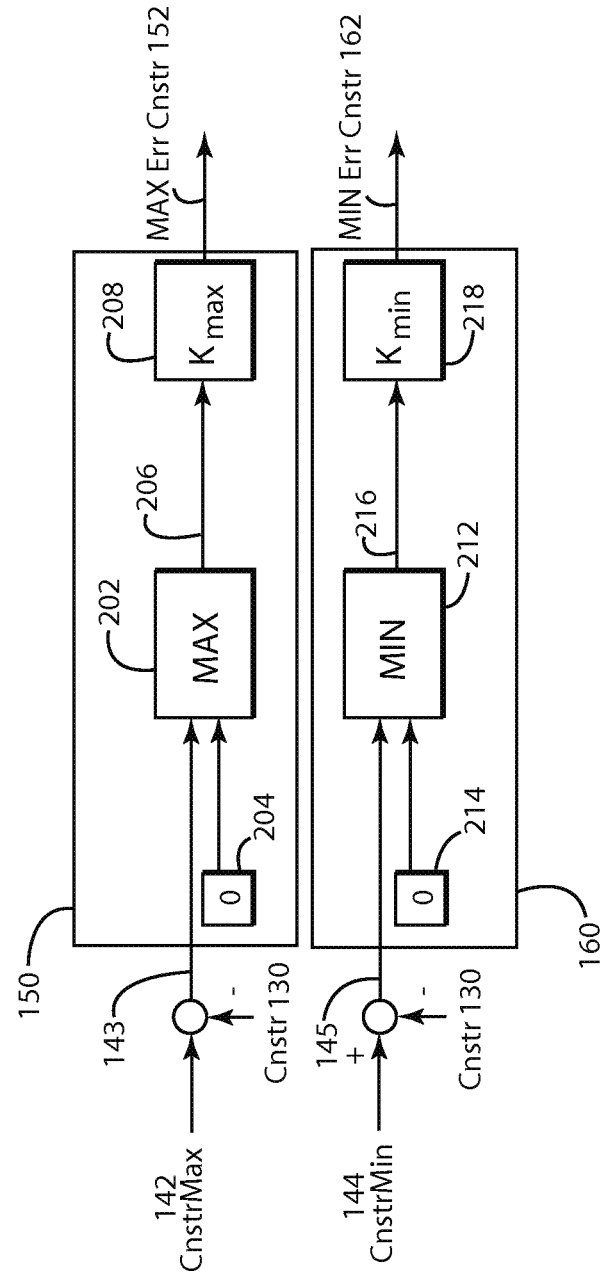
FIG. 2 illustrates one embodiment of a minimum and maximum constraint normalizing process for a system incorporating aspects of the present disclosure.

As is shown in FIG. 2, in order to generate the normalized maximum constraint error 152, a maximum select function MAX 202 outputs the maximum value 206 selected from or between the output 143 and a reference value of zero (0) in box 204. The purpose of selecting the maximum value 206 from between the output sum 143 and the zero value 204 provides protection in the presence of electrical noise or in the event of data corruption, since the output 143 should generally always be greater than or equal to zero.

A normalizing function or scalar, referred to herein as Kmax 208, is then used to generate the normalized error of the constraint to its maximum limit, or normalized maximum constraint error 152. The Kmax normalizing scalar 208 allows for maximum constraints in different engineering units and having different plant characteristic partials to be normalized with respect to the primary reference error 104. This provides the advantage that all constraints will be considered appropriately in the determination of the proper gain scalar 114 (in FIG. 1).

Before further explaining the remainder of FIG. 2, e.g., the minimum constraint error normalization process in module 160, the Kmax normalizing scalar 208 will be further described with reference to FIGS. 3, 4 and 5.

Figure 3:
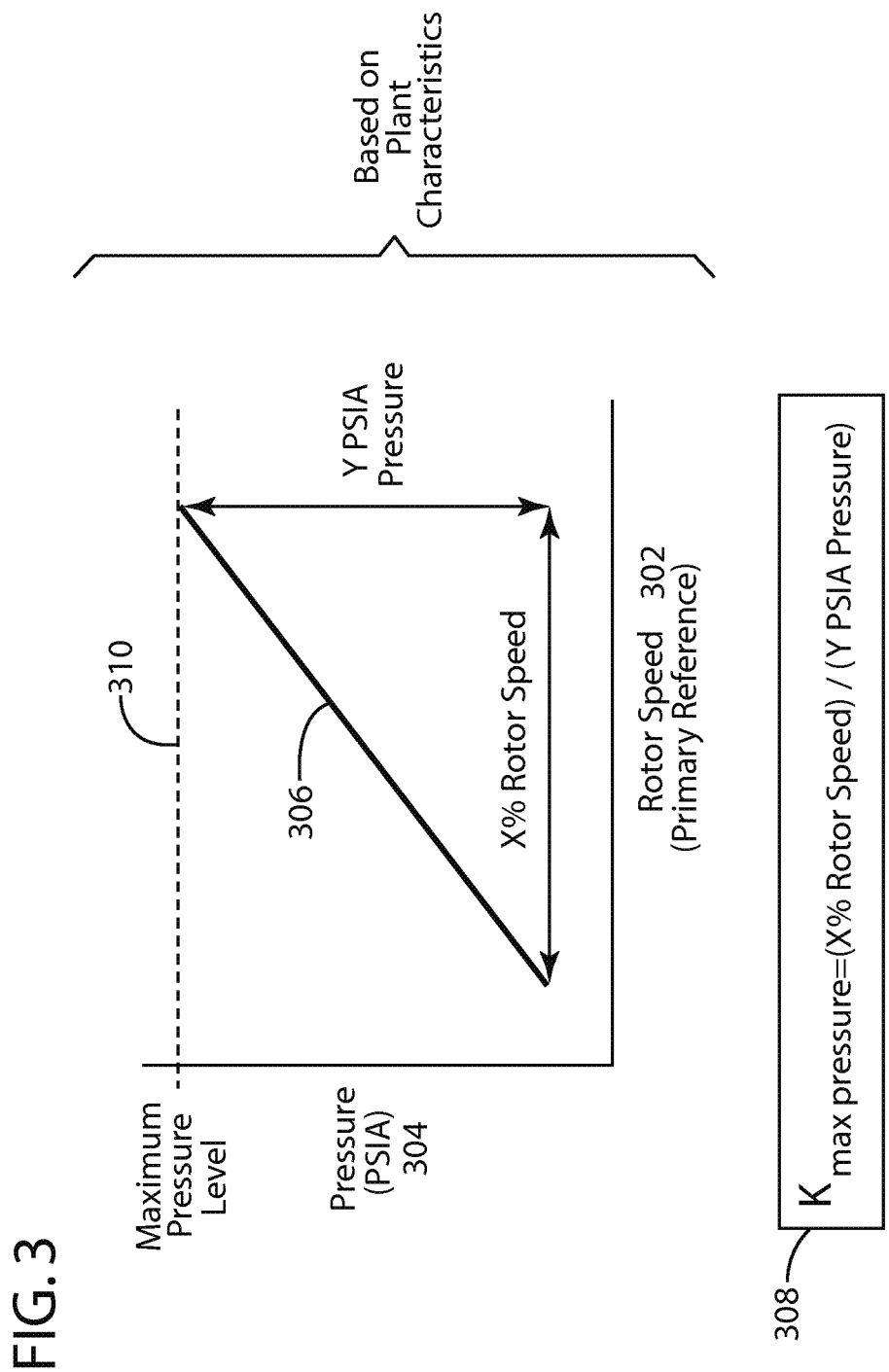
FIG. 3 illustrates an exemplary constraint normalizing constant K calculation in a linear system incorporating aspects of the present disclosure.
Figure 4:
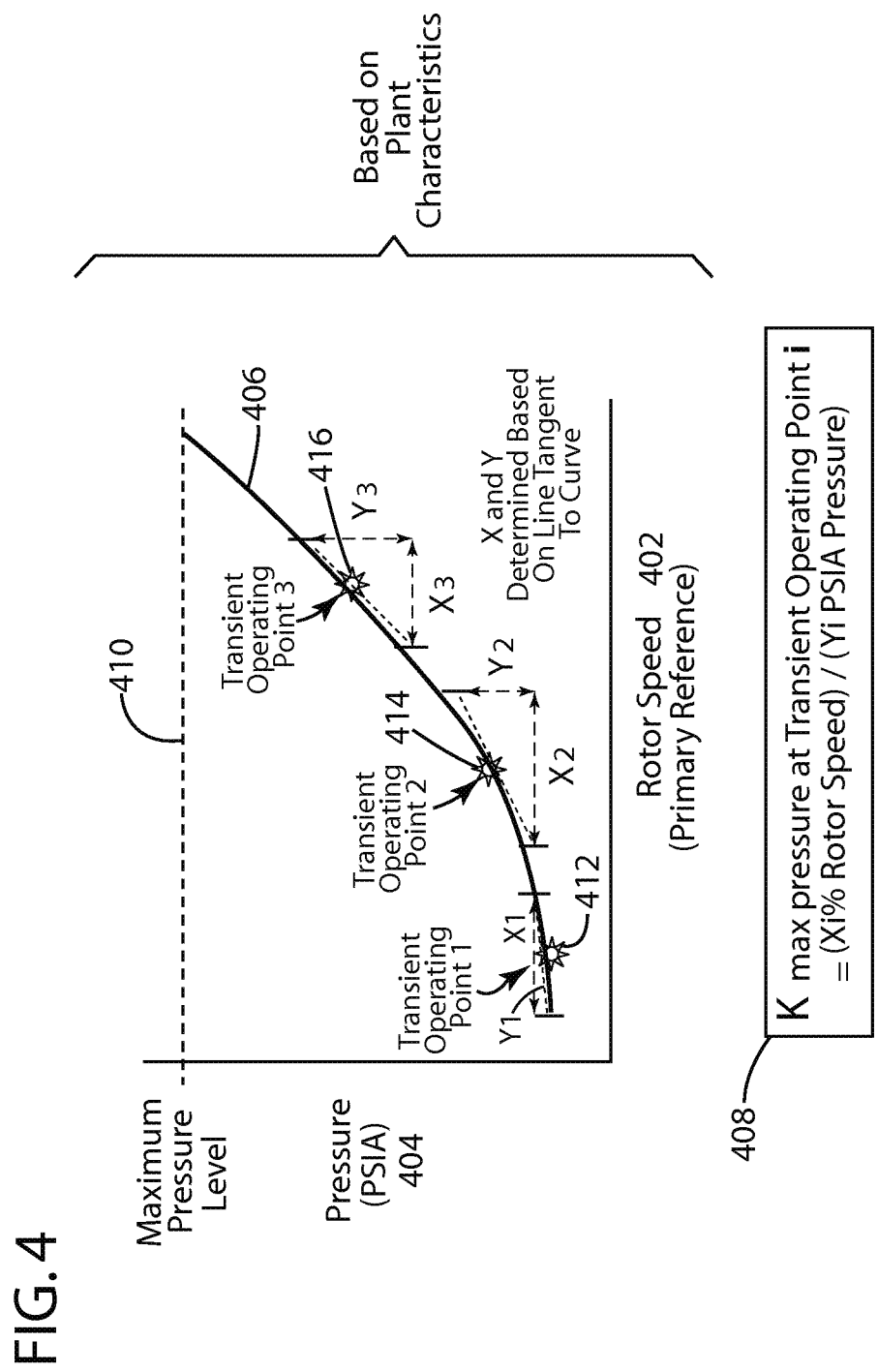
FIG. 4 illustrates an exemplary constraint normalizing constant K calculation in a non-linear system incorporating aspects of the present disclosure.
Figure 5:
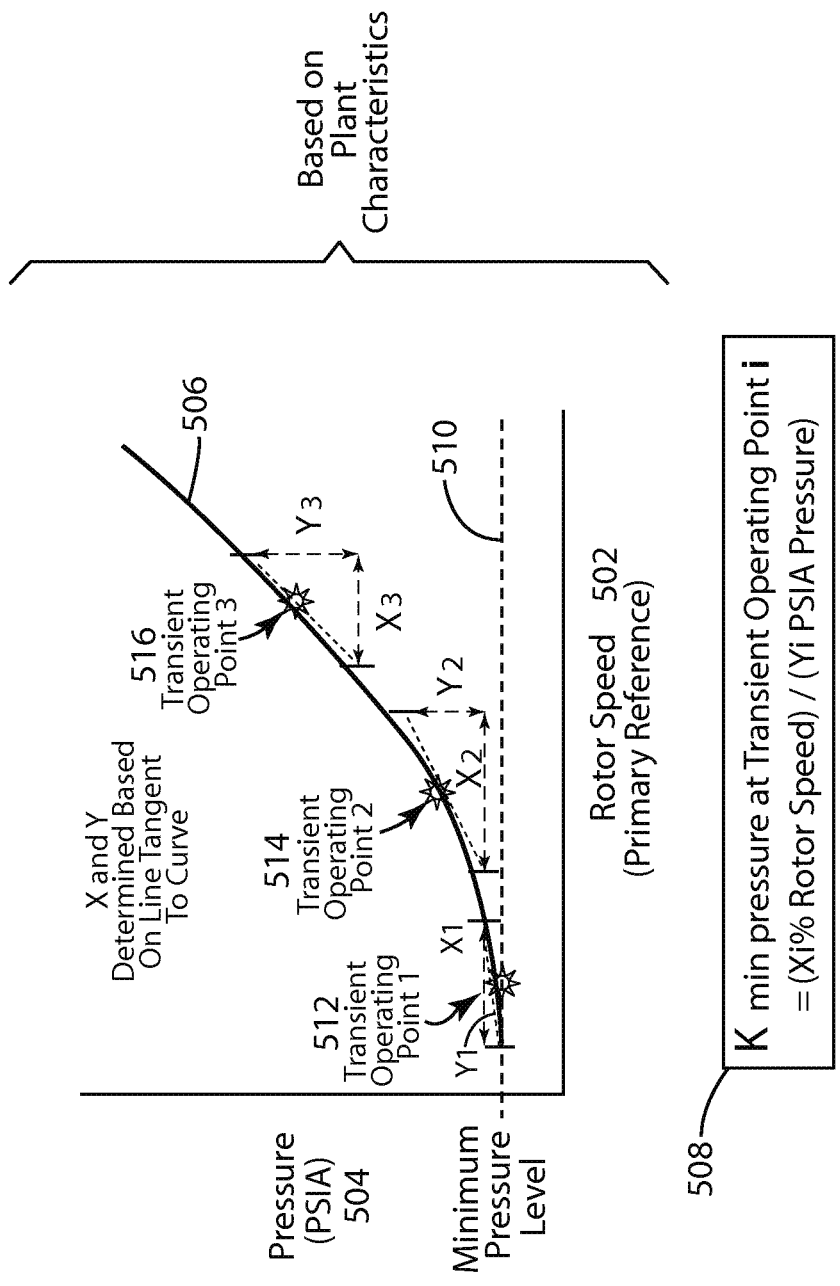
FIG. 5 illustrates an exemplary minimum constraint normalizing constant K calculation of a non-linear system minimum pressure constraint in a system incorporating aspects of the present disclosure.

FIGS. 3, 4 and 5 illustrate examples of how the normalizing scalar Kmax 208 can be determined. FIG. 3 represents an exemplary "K" calculation in a linear system. In this example, the application is a jet engine and the control constraint is a maximum pressure constraint. The primary reference input 102 of FIG. 1 in this example is the rotor speed 302. The rotor speed 302 is plotted or referenced against the pressure constraint 304. This is relationship is needed to allow the maximum constraint in pressure (psia) engineering units to be normalized with respect to the primary reference in rotor speed (rpm) engineering units and allows all constraints to be considered appropriately in the determination of the proper gain scalar 114 of FIG. 1. The curve 306 illustrates the relationship between the rotor speed 302 and the pressure constraint 304. In the example of FIG. 3, the curve 306 is substantially linear and is generally based on the characteristics of the controlled plant 120 of FIG. 1. The maximum pressure level, corresponding to the constraint maximum limit Cnstr- Max 142 of FIG. 1, is defined by line 310. The normalizing scalar is Kmax pressure 308 and is defined in this example by the equation (X % Rotor Speed)/(Y PSIA Pressure), where PSIA is "pounds per square inch absolute". Thus, the K max pressure 308 at a particular transient operating point "i" is defined by the line 306 and represents a linear characteristic of the partial of a percentage of the rotor speed relative to pressure for the controlled plant 120.

FIG. 4 is similar to FIG. 3, but presents a non-linear partial characteristic, which is represented by the non-linear curve 406. Here, the partial of the percentage of rotor speed 402 to pressure constraint 404 for the controlled plant 120 is determined for the current operating conditions and is continuously updated as the operating conditions change. The non-linear partial characteristic is used to estimate the change in the constraint feedback input Cnstr 130, in FIG. 1, expected for a given change in the primary reference feedback signal 122. In FIG. 4, the normalizing scalar Kmax 408, represents the relationship between the pressure constraint 404 and the rotor speed 402 at a transient operating point(s) "i", such as points 412, 414 and 416; and is defined by the equation Kmin pressure=(X % Rotor Speed)/(Y PSIA Pressure), where PSIA is "pounds per square inch absolute." The values for rotor speed 402 ($X_i$) and pressure constraint ($Y_i$) at each of the operating points 412, 414, 416 are determined based on a line that is tangential to the curve 406 at a particular operating point 412, 414 or 416. The maximum pressure level of the constraint in this example is defined by line 410.

Referring back to FIG. 2, one embodiment of the minimum constraint error normalization process in module 160 is illustrated. As is shown in FIG. 2, in order to determine the magnitude of the normalized minimum constraint error, such as a deceleration transient for example, the output 145, which represents the difference of the minimum constraint limit CnstrMin 144 less the constraint feedback input Cnstr 130, is applied to a minimum select function 212. The minimum select function 212 selects the minimum value from or between the output 145 and a reference value of zero (0) in box 214. The purpose of selecting the minimum value 216 between the output sum 145 and the zero value 214 provides protection in the presence of electrical noise or in the event of data corruption, since the output 145 should generally always be less than or equal to zero.

In the minimum constraint error normalization process, a normalizing scalar, referred to herein as Kmin 218, is used to generate the normalized error of the constraint to its minimum limit, also referred to as the normalized minimum constraint error 162. The Kmin normalizing scalar 218 allows for minimum constraints in different engineering units and having different plant characteristic partials to be normalized with respect to the primary reference error 104. This provides the advantage that ail constraints will be considered appropriately in the determination of the proper gain scalar 114.

The calculation of the Kmin normalizing scalar 218 is further described with respect to FIG. 5. FIG. 5 shows an example of a constraint normalizing constant Kmin calculation for a minimum constraint example in a non-linear system. In FIG. 5, a curve 506 illustrates the relationship between the primary reference input 102 of FIG. 1, which in this example is rotor speed 502, and the control constraint, which in this example is pressure 504. The minimum pressure limit is defined by line 510. In FIG. 5, the normalizing scalar Kmin 508, representing the relationship between rotor speed 502 and pressure constraint 504 at a transient operating point i, such as points 512, 514, 516, is defined by the equation Kmin pressure=($X_i$% Rotor Speed)/($Y_i$ PSIA Pressure), where PSIA is "pounds per square inch absolute." $X_i$ and $Y_i$ for each point 512, 514 and 516, are determined based on a line that is tangent to the curve 506 at each of the particular operating points 512, 514, 516. Although not shown, in a linear system, the exemplary Kmin calculation would be similar to that described with respect to FIG. 3. The minimum pressure level would be represented by a line in a manner similar to the minimum pressure level line 510 shown in FIG. 5.

The aspects of the disclosed embodiments utilize a Multiple Input Multiple Output (MIMO) regulator that allows optimum stability and dynamic response with multiple, interacting control variables. In order to protect engine limits in the event of a large transient or primary reference input 102, such as a pilot quickly increasing the throttle on a jet, the aspects of the disclosed embodiments provide MIMO cross-coupling and transient reference schedules. As is shown in FIGS. 6 and 7, when the normalized transient error 110 is "small", meaning close to stabilized operation, a control schedule reference or scalar is used that have a value substantially equal to 1. A scalar value of 1 is generally described as a "steady state" control schedule reference. FIG. 6 shows an example where the control dynamics of the controlled plant 120 are modified by changing gains in the digital control regulators. In FIG. 6, the MIMO gains for certain terms are scaled back for large transients, and smoothly transitioned back to full gain for stabilized operation.

FIG. 7 shows an example where transient versus steady state schedules are selected. As is shown in FIG. 7, when the normalized transient error 110 is "large", meaning a transient has been demanded based on a primary reference input 102 change, the control schedule reference or scalar used is substantially equal to 0. A scalar value of 0 is generally described as a "transient" control schedule reference.

In FIG. 7, a control schedule is modified for large transients, and smoothly transitioned back to the normal schedule for stabilized operation. The potential uses would not be limited to these examples and control modifications could be done singularly or in combination. The normalized transient error 110 provides a smooth transition between transient and steady state operation modes.

Although only one control constraint is referenced in FIG. 1, in alternate embodiments, the aspects of the present disclosure can be applied to multiple control constraints. In the example where the controlled plant 120 comprises a turbofan engine and the primary reference input 102 is fan speed demand based on throttle input from the cockpit, the control constraints addressed during the maximum constraint error normalization process in module 150, 850 can include for example, maximum turbine temperature, maximum fan speed, maximum core pressure and maximum compressor discharge pressure. The control constraints addressed during the minimum constraint error normalization process in module 160, 860 in this example can include, but are not limited to, minimum fan speed, minimum core speed and minimum compressor discharge pressure.

Figure 8:
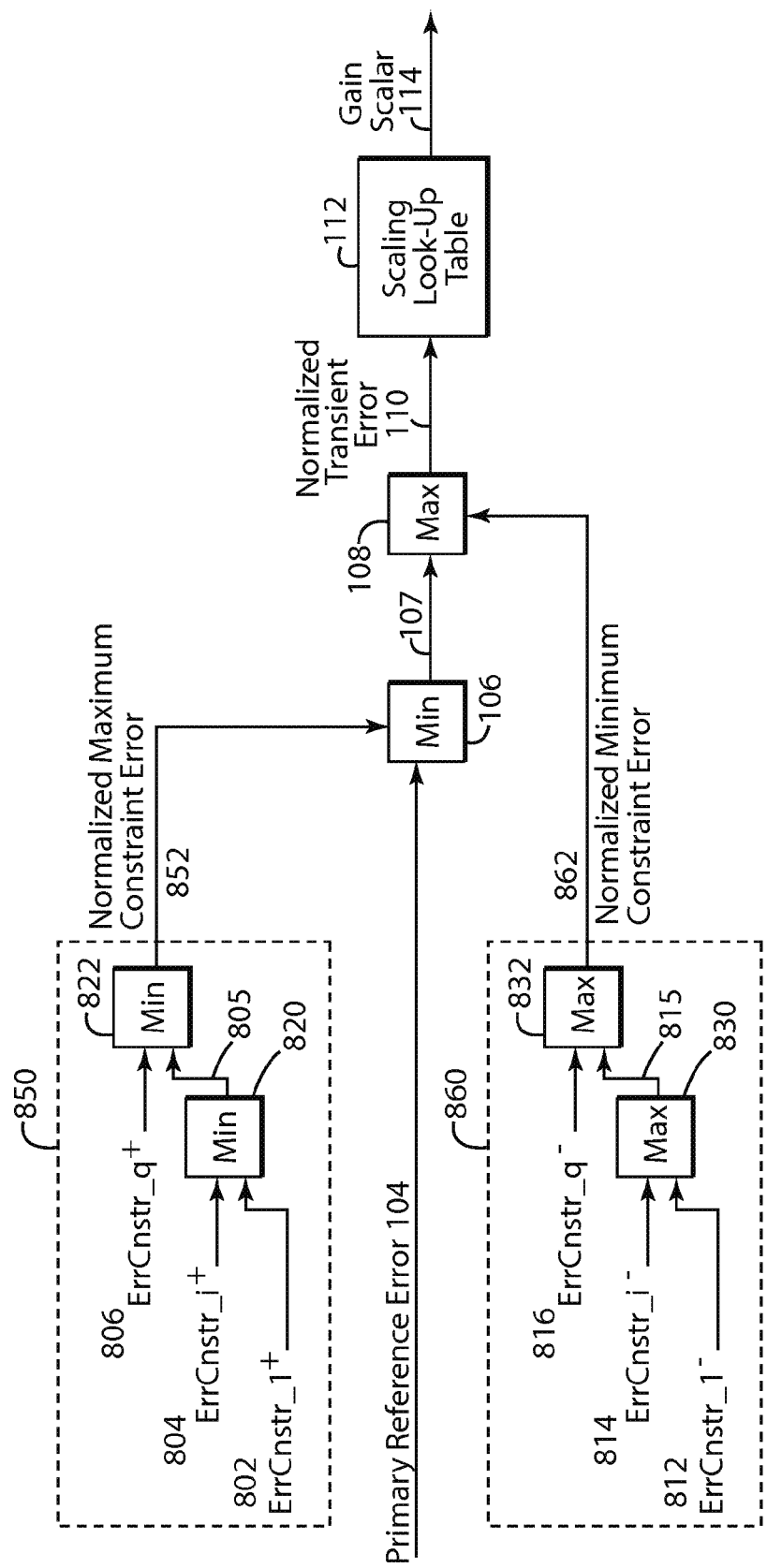
FIG. 8 illustrates one embodiment of a minimum and maximum constraint normalizing process for a system including multiple control constraints in accordance with the aspects of the present disclosure.

FIG. 8 illustrates an exemplary process for determine the normalized transient error 110 for a plurality of control constraints. Although only three control constraints 1, i and q are used in this example, it will be understood that in alternate embodiments, any number of control constraints can be used. In this example, the outputs of the maximum constraint error normalization process in module 850 for each constraint 1, i and q are referenced as 802, 804 and 806. The outputs of the minimum constraint error normalization process in module 860 for each constraint 1, i and q are referenced as 812, 814 and 816.

As shown in FIG. 8, the normalized maximum constraint errors, ErrCnstr_1$^+$ 802 and ErrCnstr_i$^+$ 804 are applied to the minimum select function 820. The output 805 of the minimum select function 820, which represents the minimum value selected from the values ErrCnstr_1$^+$ 802 and ErrCnstr_i$^+$ 804, is applied to another minimum select function 822, together with the normalized maximum constraint error ErrCnstr_q$^+$ 806. Although the minimum select functions 106, 820 and 822 are shown as separate devices or components in this example, in alternate embodiments the minimum select functions 106, 820, 822 can comprise a single device or component. The output of the minimum select function 822 is the normalized maximum constraint error 852 for the plurality of constraints 1, i and q. This selection process is required to allow appropriate tuning of the primary reference error signal 104 of FIG. 1, if a maximum or minimum constraint will be encountered prior to the controlled plant 120 reaching the value corresponding to the primary reference input 102. A minimum select on the maximum constraints is needed to reduce the transient magnitude for an increase in power demand, which is a positive primary reference control error 104. A maximum select on the minimum constraints is needed to reduce the transient magnitude for a decrease in power demand which is a negative primary reference control error 104. This provides the advantage that all constraints will be considered appropriately in the determination of the proper gain scalar 114.

In the plurality of control constraints example shown in FIG. 8, the normalized minimum constraint errors ErrCnstr_1$^-$ 812 and ErrCnstr_i$^-$ 814 are applied to the maximum select function 830. The output 815 of the maximum select function 830, which represents the maximum value selected from or between the values ErrCnstr_1$^-$ 812 and ErrCnstr_i$^-$ 814, is applied to another maximum select function 832, together with the normalized minimum constraint error ErrCnstr_q$^-$ 816. Although the maximum select functions 108, 830 and 832 are shown as separate devices or components in this example, in alternate embodiments the maximum select functions 108, 830, 832 can comprise a single device or component. The output 862 of the maximum select function 832 is the normalized minimum constraint error for the plurality of constraints 1, i and q.

As shown in FIG. 8, the normalized maximum constraint error 852 is applied together with the primary reference error signal 104 to the minimum select function 106. The output 107 of the minimum select function 106 is applied to the maximum select function 108 together with the normalized minimum constraint error 862. The output 110 of the maximum select function 108 represents the normalized transient error.

The normalized transient error 110 of FIG. 8 is then applied to the lookup table 112 to produce the gain scalar output 114, which is described with respect to FIG. 1.

Figure 9:
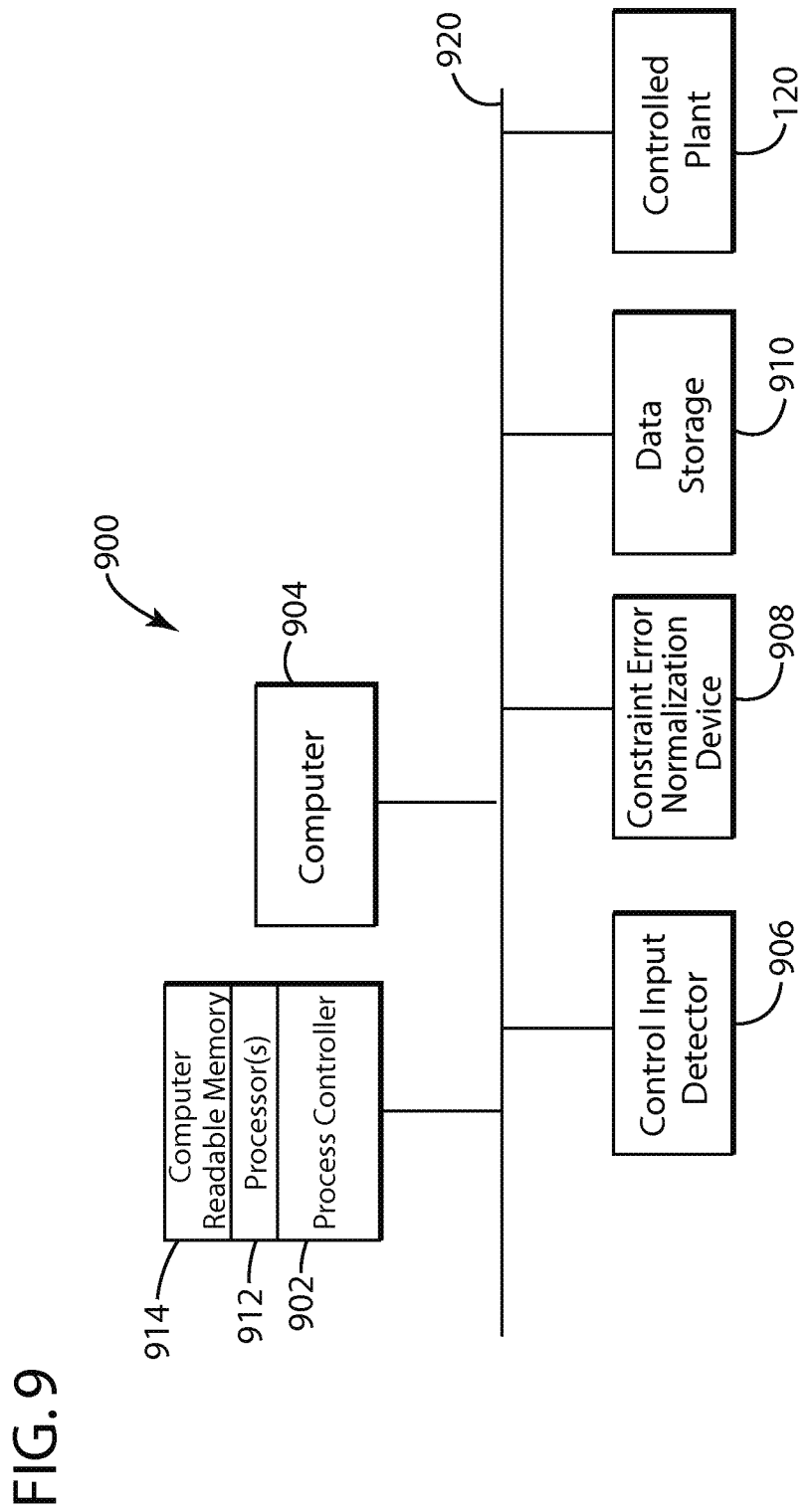
FIG. 9 is a diagram of a computer system that may be configured to perform one or more of the aspects of the disclosure shown in FIGS. 1, 2, 3, 4, 5, 6, 7 and 8.

The disclosed embodiments may also include software and computer programs incorporating the process steps and instructions described above. In one embodiment, the software and programs incorporating the processes and instructions described herein can be stored on or in a computer program product and executed in one or more process controllers or computers, such as process controller 902 and computer 904 shown in FIG. 9. FIG. 9 illustrates a block diagram of an exemplary computing apparatus 900 that can configured to implement the software and/or perform the processes and/or functions described herein. Although the process controller 902 and computer 904 are shown as separate devices in FIG. 9, in one embodiment, the process controller 902 and the computer 904 can comprise a single device. Also, the aspects of the disclosed embodiments are not limited to a single process controller 902 and computer 904 configuration. In alternate embodiments, any suitable number of process controllers 902 and computers 904 can be utilized to store and execute the processes described herein.

As is shown in FIG. 9, the process controller 902 is connected or linked to the computer 904 so that the process controller 902 and computer 904 are capable of sending information to each other and receiving information from each other. In one embodiment, the communication is implemented via a communications link or network 920. In one embodiment, the process controller 902 is also configured to receive information and data, such as the primary reference input 102 of FIG. 1, from a control input detector 906, or the normalized maximum constraint error 152 and normalized minimum constraint error 162 of FIGS. 1 and 2, from the constraint error normalization device 908, which can include for example, the modules 150 and 160 of FIG. 1. In one embodiment, both the control input detector 906 and constraint error normalization device 908 can comprise a separate processor controller or be integrated within the processor controller 902.

The communications link or network 910 can comprise any suitable or desirable communication network to facilitate the exchange of information in any conventional manner including, such as for example, a modem, wireless, hard wire connection, Ethernet network or fiber optic link. The communication between the connected components can take place using any suitable communication protocol.

In one embodiment, the apparatus 900 can include or be coupled to computer readable program code means stored on a computer readable storage medium, such as a memory for example, for carrying out and executing the process steps described herein. In one embodiment, the computer-readable medium is a non-transitory computer readable medium.

As is shown in FIG. 9, in one embodiment, the computer readable program code is stored in a data storage medium 910 or memory of the apparatus 900. In alternate embodiments, the computer readable program code can be stored in memory or memory medium that is external to, or remote from, the apparatus 900. The memory can be direct coupled or wireless coupled to the apparatus 900. The data storage medium 910 generally comprises any desired type of memory and can include any desired or known software, hardware of firmware for storing data.

The process controller 902 shown in FIG. 9 is generally adapted to utilize program storage devices embodying machine-readable program source code, which is adapted to cause the apparatus 900 to perform the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

The process controller 902 may also include one or more processors or microprocessors 912 that implements or executes one or more process control routines, stored in a computer readable memory 914 therein, or otherwise associated therewith, and communicates with the computer 904, control input detector 906 and data storage 910, for executing stored programs and controlling the processes described herein. It should be noted that the control processes or routines described herein can have parts thereof implemented or executed by processors in different controllers or other devices and the computer programs or software incorporating the processes and method steps incorporating aspects of the disclosed embodiments may also be stored in one or more process controllers 902 or computers 904 on an otherwise conventional program storage device.

Figure 10:
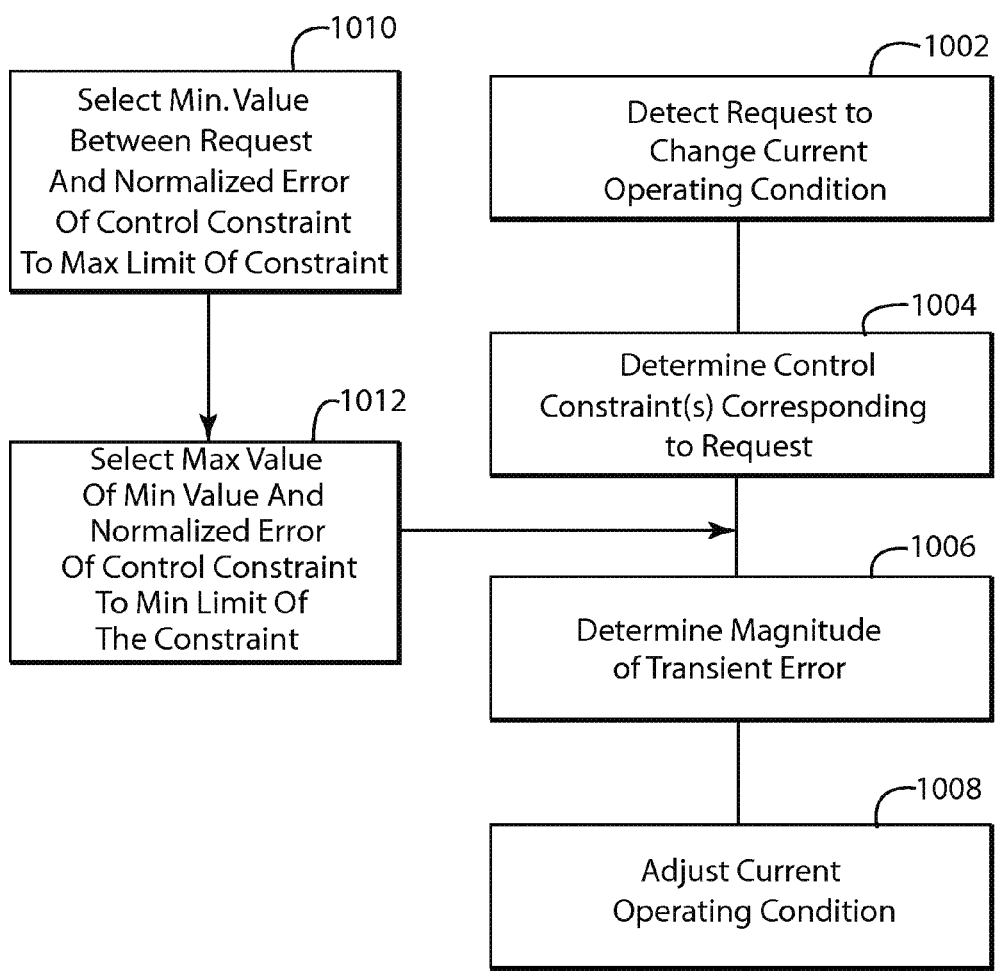
FIG. 10 is a flowchart illustrating a process flow for an embodiment of the present disclosure.

FIG. 10 illustrates one embodiment of a process flow incorporating aspects of the disclosed embodiments that can be executed by, for example, the apparatus 900 shown in FIG. 9. In one embodiment, a request to change a current operating condition of the controlled plant 120 is detected 1002. At least one control constraint corresponding to the request to change the current operating condition of the controlled plant is determined 1004. A magnitude of a transient error corresponding to the request to change the current operating condition of the controlled plant relative to the control constraint is determined 1006. A current operating condition of the controlled plant is adjusted 1008 based on the determined magnitude of the transient error.

In one embodiment, determining 1006 of the magnitude of the transient error corresponding to the request relative to the control constraint comprises selecting 1010 a minimum value between a value of the detected request 1002 and a value of the normalized maximum control constraint error. A maximum value is selected 1012 between the selected minimum value 1010 and a value of the normalized minimum control constraint error. The maximum value selected 1012, represents the magnitude of the transient error and is used to adjust 1008 the current operating condition of the controlled plant 120 shown in FIG. 1.

The aspects of the disclosed embodiments provide large transient identification for advanced control with multiple constraints. To provide the improved large transient control, the size of the requested transient is first determined, including all potential minimum and maximum limit control constraints. The cross-coupling and transient control references are the optimally scheduled based on a calculated "normalized transient error." In one embodiment, the error between a current operating condition and all potential control constraints is determined. A normalization process is used to select the magnitude of the transient being requested. The magnitude of the transient as selected from the normalization process is used to determine an appropriate amount of scaling on the cross-coupling terms. In one embodiment, a scalar of 1.0 can be used for smaller transients, while a scalar that is less than 1.0 can be used for larger transients. The optimum scalar is typically a continuous curve that is based on the transient magnitude as depicted in FIGS. 6 and 7.

In addition, the aspects of the disclosed embodiments allow for a smooth transition of desired control modifications going from stabilized operation to a large transient and from a large transient to stabilized operation. The shape of the curve areas labeled "Transition" on FIGS. 6 and 7 sets the smooth transition. The aspects of the disclosed embodiments thus provide optimum control of critical requirements for both steady state and transient operation.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method, comprising:
   detecting, in a controller, a primary reference input, corresponding to a request to change a current operating condition of a controlled plant;
   determining, a value of a control constraint corresponding to the request to change the current operating condition of the controlled plant;
   determining a magnitude of a transient error corresponding to the request relative to the value of the control constraint;
   generating a normalized maximum constraint error;
   generating a normalized min constraint error;
   normalizing the constraint error;
   comparing the normalized constraint error with the primary reference input;
   selecting a minimum value between the primary reference input and a normalized error of the control constraint to a maximum limit;
   selecting a maximum value between the selected minimum value and a normalized error of the control constraint to a minimum limit; and
   adjusting the current operating, condition of the controlled plant based on the determined magnitude of the transient error.

2. The method of claim 1, wherein the controller is configured to determine the value of the normalized error of the control constraint to the maximum limit by applying a value of a difference between a maximum value of the control constraint and a current setpoint value of the control constraint to a normalizing function.

3. The method of claim 1, wherein the controller is configured to determine the value of the normalized error of the control constraint to the minimum limit by applying a value of a difference between a minimum value of the control constraint and a current setpoint value of the control constraint to a normalizing function.

4. The method of claim 1, wherein an absolute value of the difference between the maximum value of the control constraint and the current setpoint value of the control constraint is proportional to a magnitude of the request to change the current operating condition of the controlled plant.

5. The method of claim 1, wherein determining the magnitude of the transient error comprises:
   selecting a maximum value between the normalized error of the control constraint to the minimum limit and a minimum value selected between the normalized error of the control constraint to the maximum limit and the primary reference input.

6. The method of claim 1, wherein the controlled plant is a gas turbine based powerplant, a vehicle, a marine turbine or a wind turbine.

7. The method of claim 1, wherein a look-up table is used to control an operating condition of the controlled plant.

8. The method of claim 7 wherein adjusting the current operating condition of the controlled plant based on the determined magnitude of the transient error comprises:

selecting a gain scalar from the look-up table based on the determined magnitude;

adjusting a control gain for the controlled plant based on the gain scalar; and changing the current operating condition of the controlled plant according to the adjusted control gain.

9. The method of claim 1, wherein the controlled plant is a jet engine, the current operating condition is rotor speed and the control constraint is a pressure for the jet engine, and wherein the normalized scalar is defined by a relationship between a partial percentage of rotor speed relative to the pressure for the jet engine.

10. The method of claim 9, wherein a value of the gain scalar is in and/or including the range of 0 to 1.

11. A control system for a controlled plant, the control system comprising:

a control input, detector configured to detect a request to change a current operating condition of the controlled plant;

a constraint error normalization device configured to determine, for a control constraint of the controlled plant associated with the request, a normalized error of the control constraint to a maximum limit and a normalized error of the control constraint to a minimum limit; and a controller coupled with the control input detector and constraint error normalization device, the controller being configured to:

determine a magnitude of a transient error relative to the request to change an operating condition of the controlled, plant by comparing a value of a primary reference input corresponding to the request to the normalized error of the control constraint to the maximum limit and the normalized error of the control constraint to the minimum limit;

generate a normalized maximum constraint error;

generate a normalized minimum constraint error;

select a minimum value between the value of the primary reference input and the normalized error of the control constraint to the maximum limit, and select a maximum value between the selected minimum value and the normalized error of the control constraint to the minimum limit, wherein the selected maximum value is proportional to the magnitude of the transient error; and adjust the current operating, condition of the controlled plant based on the determined magnitude of the transient error.

12. The control system of claim 11, wherein the controller is configured to determine the normalized error of the control constraint to the maximum limit by applying a value of a difference between a maximum limit value of the control constraint and a current setpoint value of the constraint to a normalizing function.

13. A The control system of claim 11, wherein the controller is configured to determine the normalized error of the control constraint to the minimum limit by applying a value of a difference between a minimum limit value of the control constraint and a current setpoint value of the control constraint to a normalizing function.

14. The control system of claim 11, wherein the controlled plant is a gas turbine based powerplant, a vehicle, a marine turbine or a wind turbine.

15. The control system of claim 11, wherein the controller is configured to adjust a control gain of the controlled plant corresponding to the request based on the determined transient error magnitude by selecting a gain scalar from a look-up table based on the determined transient error magnitude and provide a control gain adjustment input for the controlled plant based on the gain scalar.

16. The control system of claim 15, wherein the controlled plant is a jet engine, the current operating condition is rotor speed and the control constraint is a pressure for the jet engine, and wherein the gain scalar is defined by a relationship between a partial percentage of rotor speed relative to the pressure for the jet engine.

17. The control system of claim 11, wherein the controller is configured to determine the transient error magnitude by selecting a minimum value between the primary reference input and the normalized error of the control constraint to the maximum limit and a maximum value between the selected minimum value and a normalized error of the control constraint to the minimum limit.

18. A computer program product, comprising:

a non-transitory computer readable storage medium configured to execute the method according to claim 1 on a computing device.

* * * * *

UNITED STATES PATENT AND TRADEMARK OFFICE
CERTIFICATE OF CORRECTION

PATENT NO. : 8,527,070 B2 Page 1 of 1
APPLICATION NO. : 13/075255
DATED : September 3, 2013
INVENTOR(S) : Lu et al.

It is certified that error appears in the above-identified patent and that said Letters Patent is hereby corrected as shown below:

On the Title Page, in Item (54), and in the Specifications, Column 1, Line 4, in Title, delete "CONTRAINTS" and insert -- CONSTRAINTS --, therefor.

In the Drawings
In Fig. 7, Sheet 7 of 10, delete "Steday State" and insert -- Steady State --, therefor.

In the Specifications
In Column 3, Line 38, delete "periods," and insert -- periods. --, therefor.

In Column 7, Line 52, delete "that ail" and insert -- that all --, therefor.

In the Claims
In Column 12, Line 16, in Claim 1, delete "determining," and insert -- determining --, therefor.

In Column 12, Line 23, in Claim 1, delete "min" and insert -- minimum --, therefor.

In Column 12, Line 33, in Claim 1, delete "operating," and insert -- operating --, therefor.

In Column 12, Line 65, in Claim 8, delete "7" and insert -- 7, --, therefor.

In Column 13, Line 17, in Claim 11, delete "input," and insert -- input --, therefor.

In Column 13, Lines 29-30, in Claim 11, delete "controlled, plant" and insert -- controlled plant --, therefor.

In Column 14, Line 1, in Claim 11, delete "operating, condition" and insert -- operating condition --, therefor.

In Column 14, Line 10, in Claim 13, delete "A The" and insert -- The --, therefor.

Signed and Sealed this
Eleventh Day of March, 2014

Michelle K. Lee
*Deputy Director of the United States Patent and Trademark Office*